United States Patent
Levsen

(10) Patent No.: US 10,786,919 B2
(45) Date of Patent: Sep. 29, 2020

(54) ECCENTRIC BLADE HOUSING FOR ROTARY KNIFE

(71) Applicant: Hantover, Inc., Overland Park, KS (US)

(72) Inventor: Clark A. Levsen, Shawnee, KS (US)

(73) Assignee: Hantover, Inc., Overland Park, KS (US)

( * ) Notice: Subject to any disclaimer, the term of this patent is extended or adjusted under 35 U.S.C. 154(b) by 657 days.

(21) Appl. No.: 15/240,508

(22) Filed: Aug. 18, 2016

(65) Prior Publication Data

US 2018/0050458 A1 Feb. 22, 2018

(51) Int. Cl.
  *A22B 5/16* (2006.01)
  *A22C 17/04* (2006.01)
  *B26B 25/00* (2006.01)
  *B26D 7/26* (2006.01)

(52) U.S. Cl.
  CPC ............ *B26B 25/002* (2013.01); *A22B 5/165* (2013.01); *A22C 17/04* (2013.01); *B26D 7/2621* (2013.01)

(58) Field of Classification Search
  CPC ........... A22B 5/165; A22B 3/10; A22C 17/04; A22C 17/12; B26B 25/002; B23D 45/16; B26D 7/2621; B27B 5/14
  USPC ........... 30/276, 389; 452/132, 133, 137, 149
  See application file for complete search history.

(56) References Cited

U.S. PATENT DOCUMENTS

| | | | | |
|---|---|---|---|---|
| 3,024,532 A | * | 3/1962 | Bettcher | B26B 25/002 30/276 |
| RE25,947 E | * | 12/1965 | Bettcher | A22B 3/10 30/276 |
| 4,178,683 A | * | 12/1979 | Bettcher | B26B 25/002 30/276 |
| 4,363,170 A | * | 12/1982 | McCullough | B26B 25/002 30/276 |
| 4,575,938 A | * | 3/1986 | McCullough | B26B 25/002 30/276 |
| 4,619,047 A | * | 10/1986 | Heckman | A22B 5/165 30/276 |

(Continued)

OTHER PUBLICATIONS

PCT International Search Report and Written Opinion from PCT Application No. PCT/US17/46427 entitled Ccentric Blade Housing for Rotary Knife(dated Nov. 6, 2017).

*Primary Examiner* — Clark F Dexter
(74) *Attorney, Agent, or Firm* — Hovey Williams LLP

(57) ABSTRACT

A rotary knife includes a frame, an annular blade, and a blade housing mounted to the frame. The housing presents a circumferential mounting surface in contact with the frame. The housing supports the blade on the frame for rotation about a central axis. The housing includes a blade-supporting race defined along a circle centered on the central axis. The mounting surface is defined along a circular arc with a center point spaced from the central axis, such that the blade-supporting race and mounting surface are eccentric relative to one another. The housing presents opposite inner and outer annular faces. At least one of the faces presents a proximal-most end in contact with the frame and a distal-most end spaced from the frame. The proximal-most end is spaced from the central axis a first distance. The distal-most end is spaced from the central axis a second distance. The distances are different.

36 Claims, 13 Drawing Sheets

(56) References Cited

U.S. PATENT DOCUMENTS

| | | | |
|---|---|---|---|
| 5,099,734 A * | 3/1992 | Sugiyama et al. ... | B26D 7/2621 83/425.4 |
| 5,529,532 A * | 6/1996 | Desrosiers ............. | A61C 13/12 30/276 |
| 8,074,363 B2 | 12/2011 | Whited | |
| 8,661,692 B2 | 3/2014 | Whited et al. | |
| 9,051,965 B1 * | 6/2015 | Spektor ................ | F16C 19/505 |
| 2007/0283574 A1 * | 12/2007 | Levsen ................ | A22B 5/165 30/276 |
| 2013/0025138 A1 * | 1/2013 | Whited et al. ......... | A22B 5/165 30/276 |
| 2013/0104404 A1 | 5/2013 | Levsen | |
| 2015/0298328 A1 | 10/2015 | Levsen | |
| 2015/0298329 A1 | 10/2015 | Levsen | |

* cited by examiner

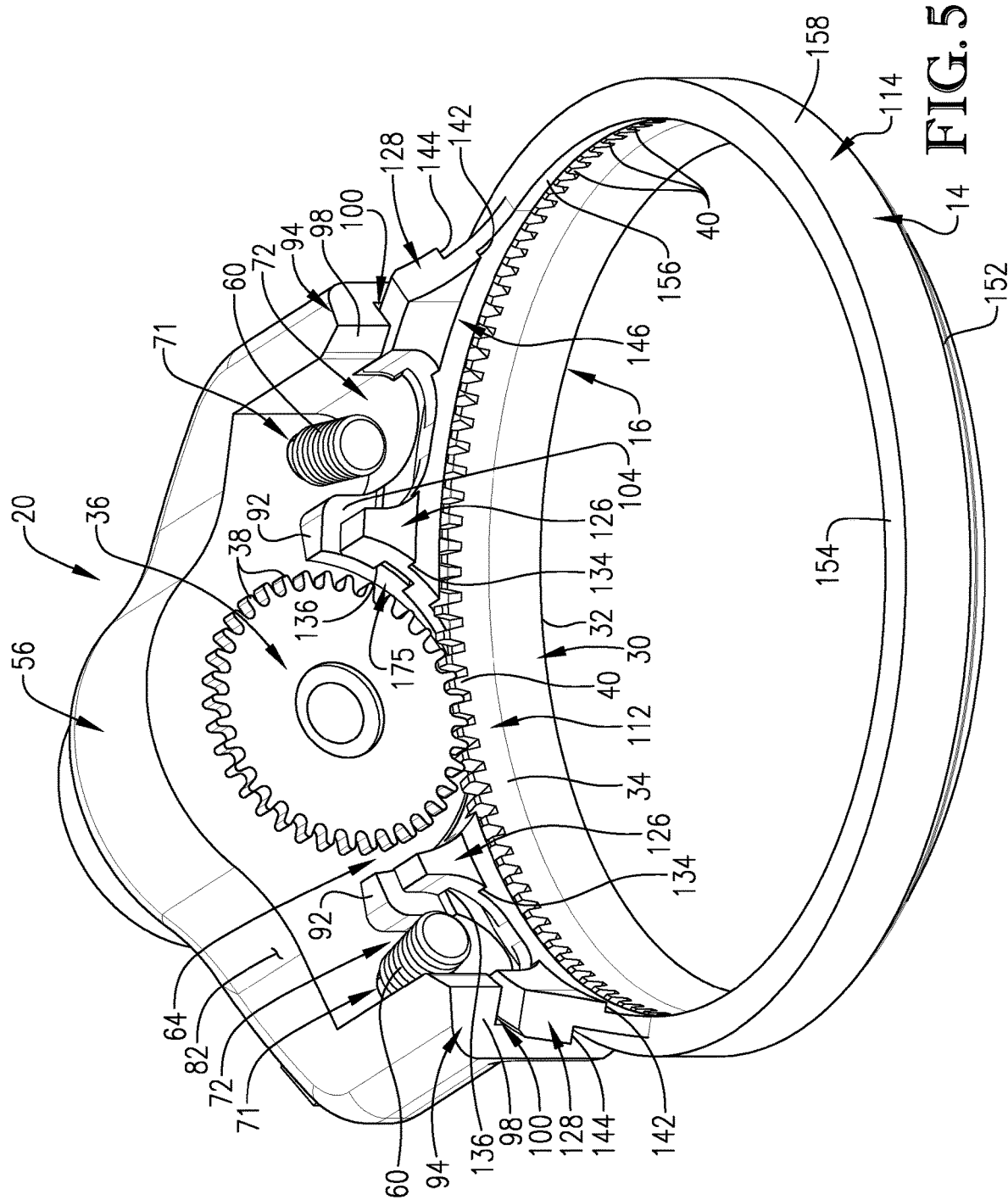

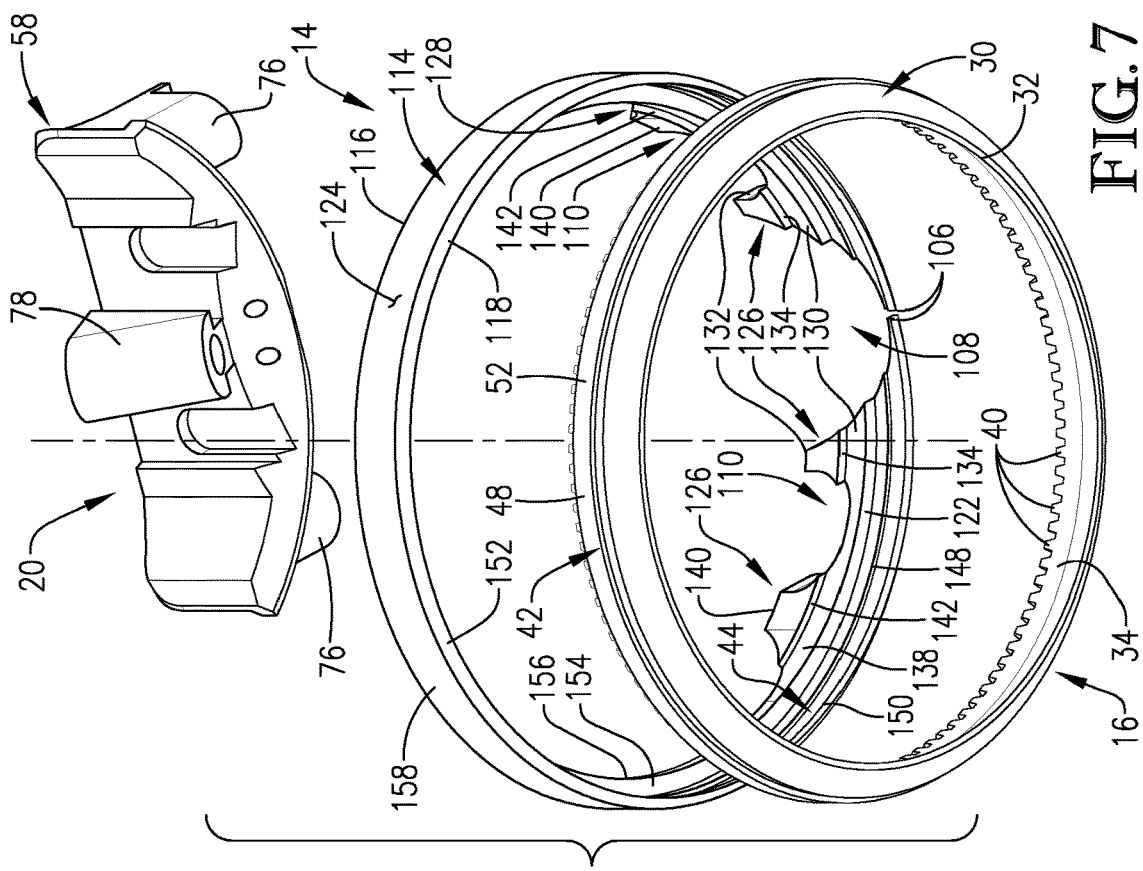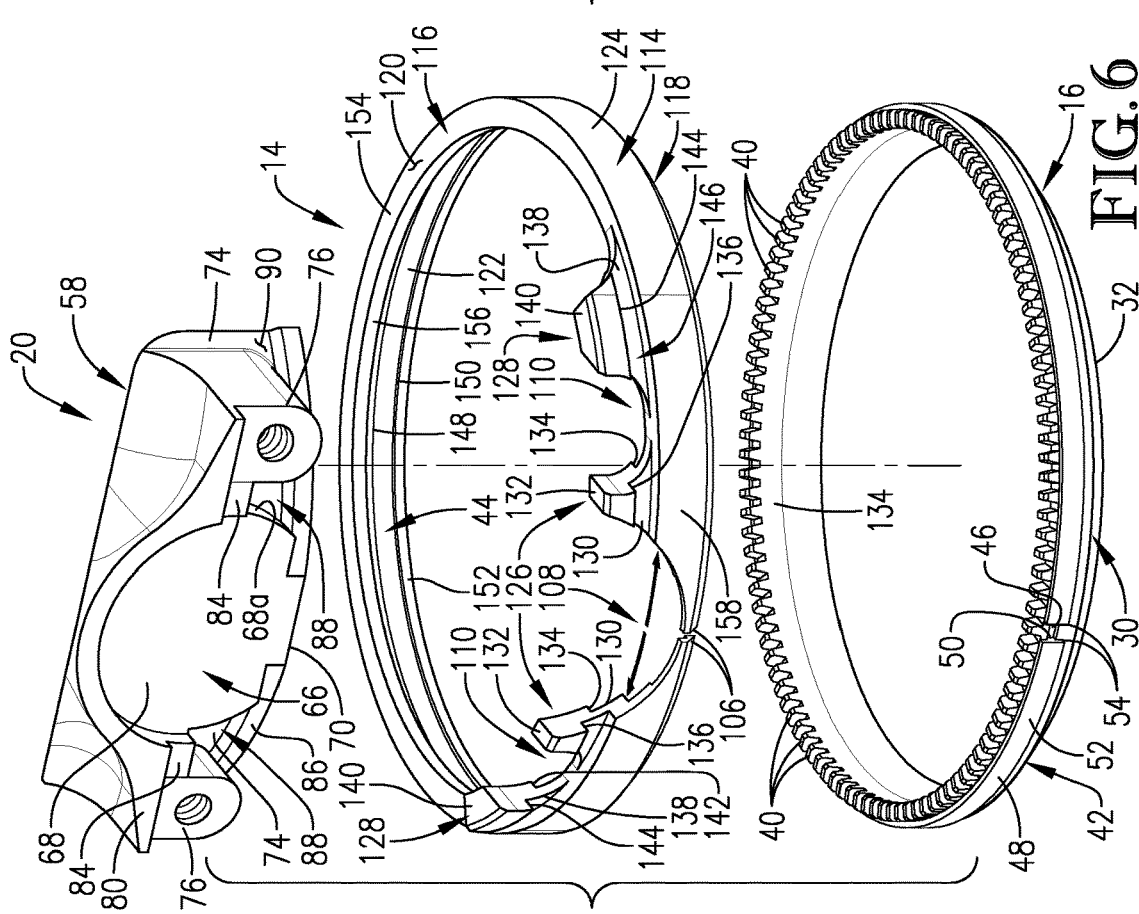

ECCENTRIC BLADE HOUSING FOR ROTARY KNIFE

BACKGROUND

1. Field

The present invention relates generally to powered knives, such as those commonly used in slaughterhouses for meat processing. More specifically, the present invention concerns a rotary knife with a rotating annular blade and a blade housing supporting the blade.

2. Discussion of Prior Art

Powered rotary knives that are used in the meat processing industry for dressing an animal carcass are known in the art. The process of dressing the carcass normally involves the removal of meat and fat from various bones as well as the cutting of various tissues. Powered rotary knives enable workers to perform this process with great efficiency relative to manual methods.

Prior art powered rotary knives typically include a housing and a rotating annular blade that can be removed for sharpening or replacement. Those of ordinary skill in the art will appreciate that blades typically require resharpening or replacement multiple times a day.

SUMMARY

The following brief summary is provided to indicate the nature of the subject matter disclosed herein. While certain aspects of the present invention are described below, the summary is not intended to limit the scope of the present invention.

A first aspect of the present invention concerns a rotary knife comprising a frame, an annular blade, and a blade housing mounted on the frame. The housing presents a circumferential mounting surface in contact with the frame. The housing supports the blade on the frame for rotation about a central axis. The housing includes a blade-supporting race defined along a circle centered on the central axis. The mounting surface of the housing is defined along a circular arc with a center point spaced from the central axis, such that the blade-supporting race and mounting surface are eccentric relative to one another.

A second aspect of the present invention concerns a blade housing for a rotary knife, wherein the housing is operable to support an annular blade on a frame for rotation about a central axis. The blade housing includes a circumferential mounting surface configured to contact the frame. The housing further includes a blade-supporting race defined along a circle centered on the central axis. The mounting surface of the housing is defined along a circular arc with a center point spaced from the central axis, such that the blade-supporting race and mounting surface are eccentric relative to one another.

According to a third aspect of the present invention, a rotary knife comprises a frame, an annular blade, and a blade housing mounted on the frame. The housing presents opposite inner and outer annular faces, with at least one of the faces presenting a proximal-most end in contact with the frame and a distal-most end spaced from the frame. The housing supports the blade on the frame for rotational movement about a central axis. The proximal-most end is spaced from the central axis a first distance, and the distal-most end is spaced from the central axis a second distance, with the distances being different.

A fourth aspect of the present invention concerns a blade housing for a rotary knife, wherein the housing is operable to support an annular blade on a frame for rotation about a central axis. The blade housing includes opposite inner and outer annular faces, with at least one of said faces presenting a proximal-most end configured to contact the frame and a distal-most end configured to be spaced from the frame. The proximal-most end is spaced from the central axis a first distance, and said distal-most end is spaced from the central axis a second distance, with the distances being different.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 5 is a fragmentary upper perspective view of the rotary knife shown in FIGS. 1-4, particularly illustrating the pinion housing being in engagement with the blade housing;

FIG. 6 is an exploded upper perspective view of only the pinion cover, blade housing, and blade of the rotary knife shown in FIGS. 1-5, away from one another;

FIG. 7 is an exploded lower perspective view of the knife components shown in FIG. 6;

Figure 8:
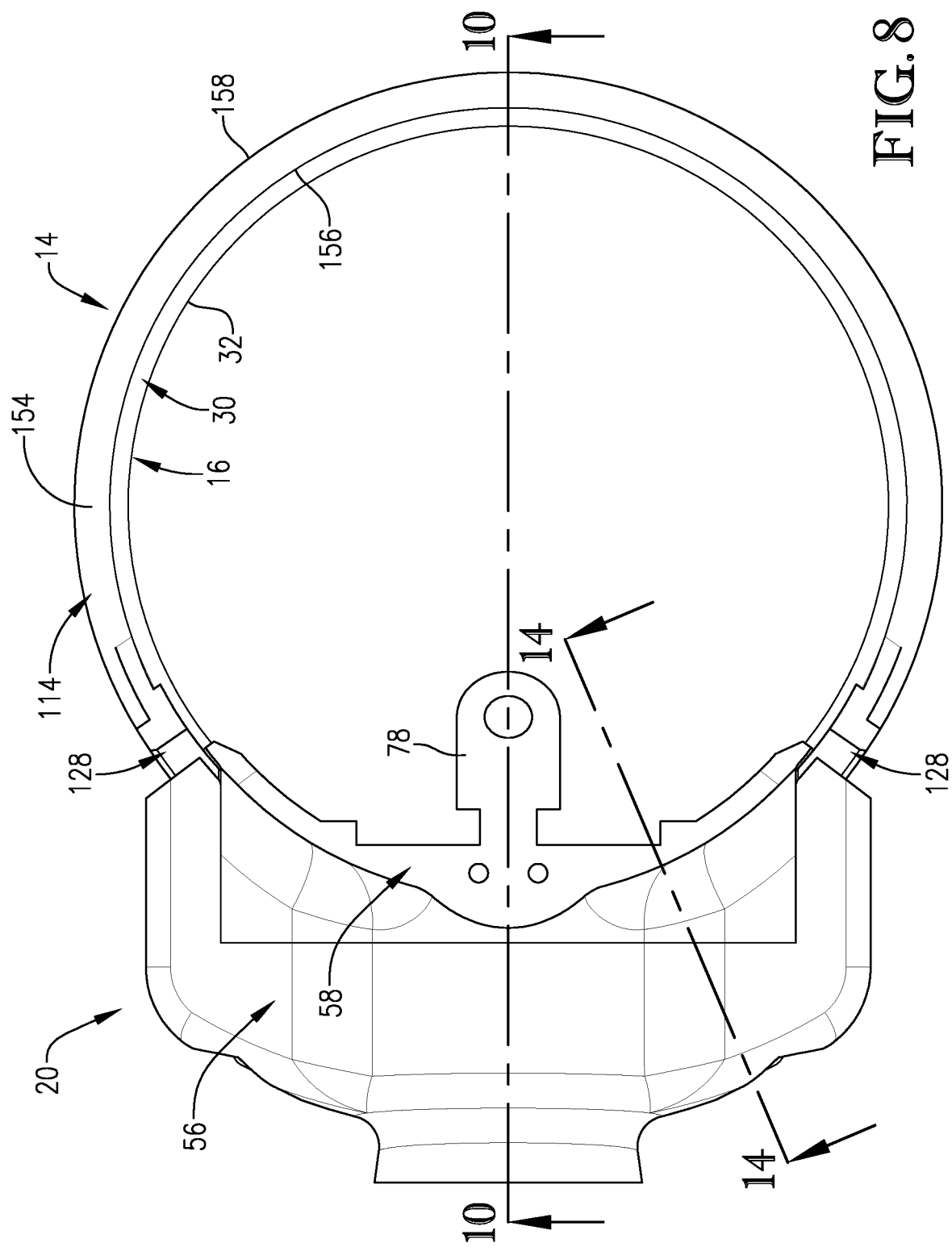
FIG. 8 is a fragmentary top elevation view of the rotary knife shown in FIGS. 1-7.
Figure 9:
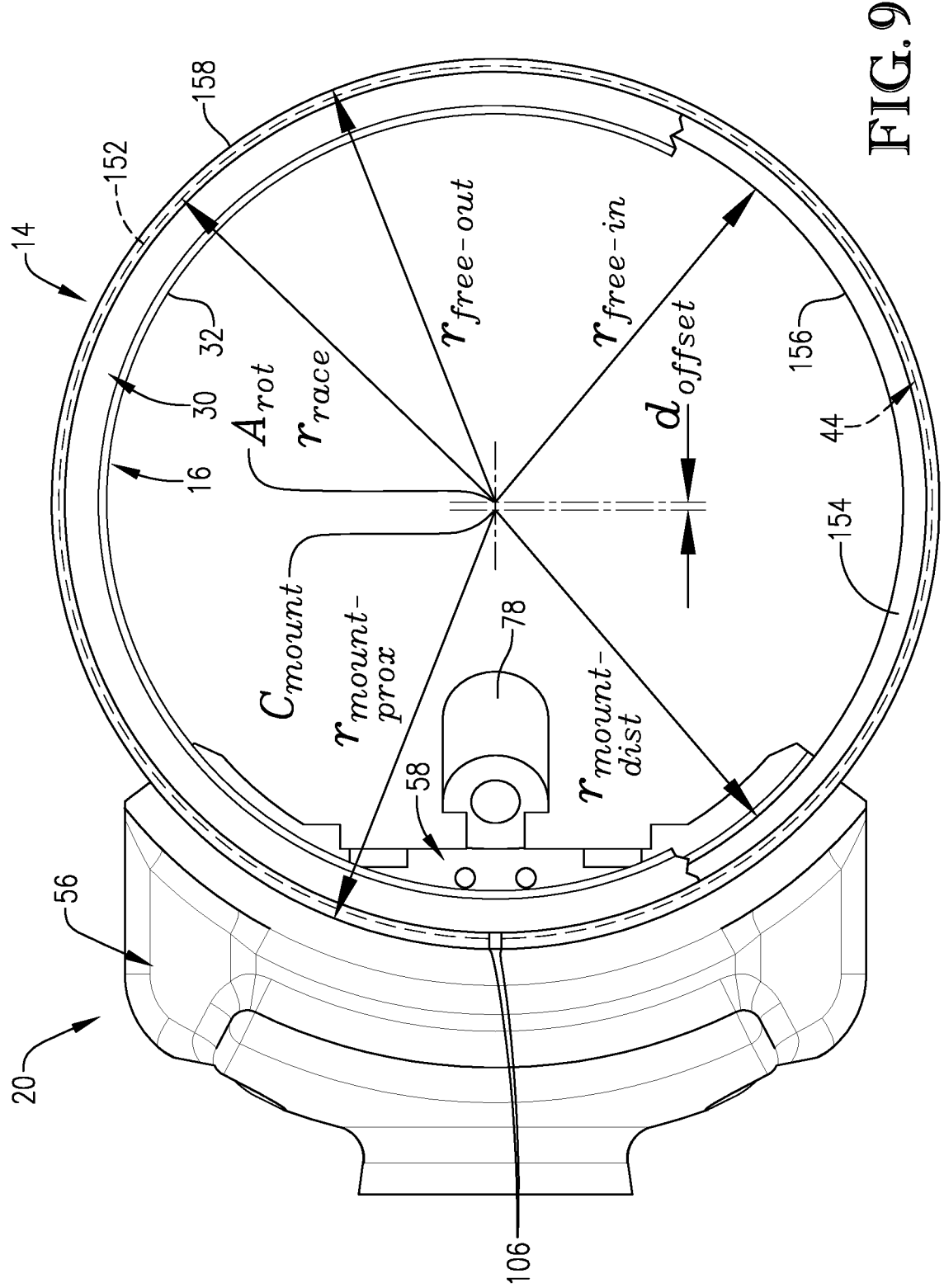
FIG. 9 is a fragmentary bottom elevation view of the rotary knife, with parts being broken away to depict the radii and circular center points associated with the different portions of the blade housing.
Figure 13:
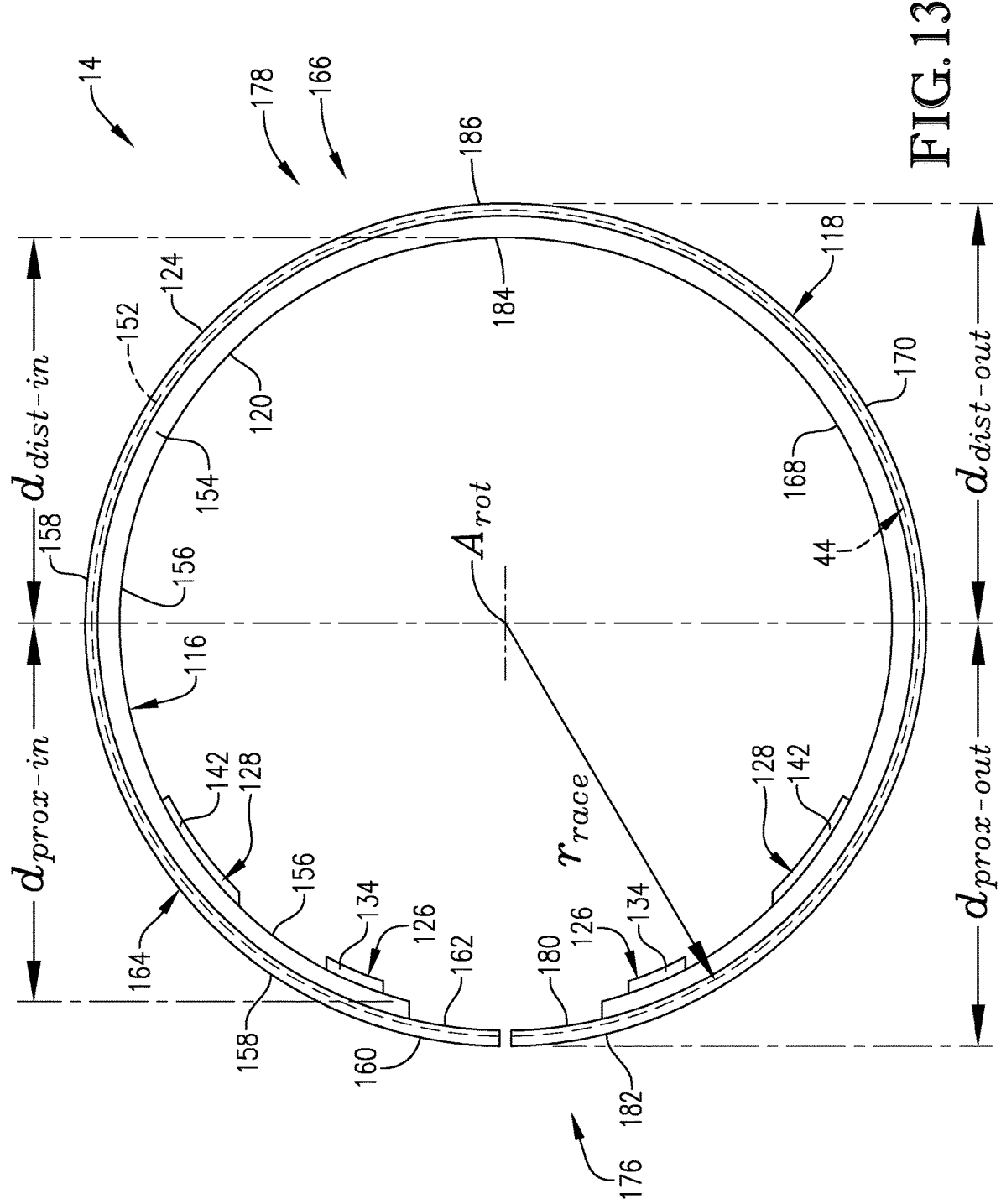
Figure 14:
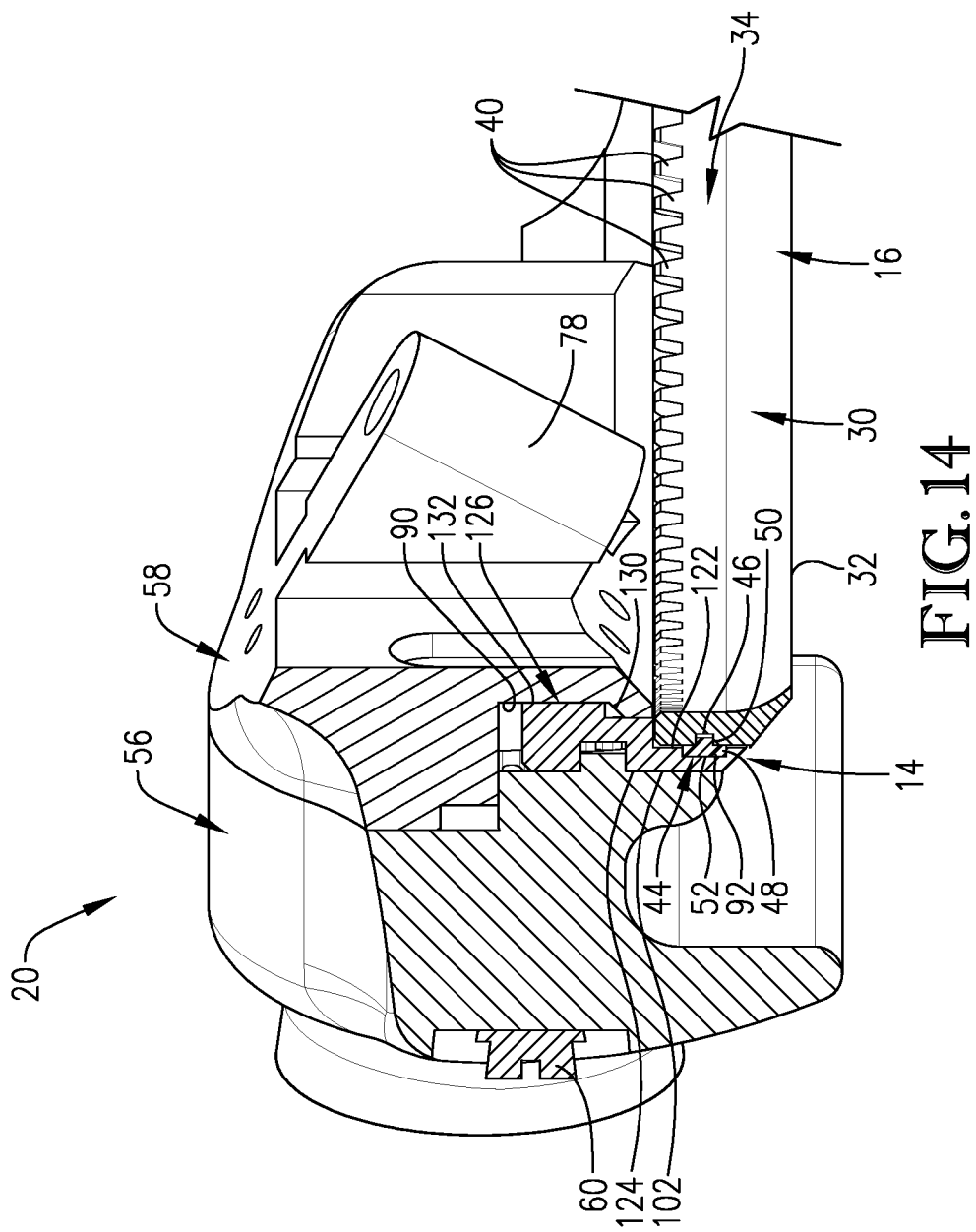

FIG. 13 is a bottom elevation view of only the blade housing of the rotary knife, particularly illustrating the distance between eccentric portions of the housing relative to the central rotational axis of the blade; and FIG. 14 is a cross-sectional view of the rotary knife taken along line 14-14 of FIG. 8, particularly illustrating the engagement between the blade housing, the pinion cover, and the pinion housing.

The drawing figures do not limit the present invention to the specific embodiments disclosed and described herein. The drawings are not necessarily to scale, emphasis instead being placed upon clearly illustrating the principles of the preferred embodiment.

Furthermore, directional references (e.g., top, bottom, front, back, side, etc.) are used herein solely for the sake of convenience and should be understood only in relation to each other unless otherwise made clear. For instance, a component might in practice be oriented such that faces referred to as "top" and "bottom" are sideways, angled, inverted, etc. relative to the chosen frame of reference. Similarly, terms such as "proximal" and "distal" should be understood in a relative sense.

Yet further, locational descriptions such as "radially inner," "radially outer," etc. should not be construed as limiting the subject structure to a circular form unless otherwise specified.

DETAILED DESCRIPTION

Turning initially to FIGS. 1-4, a rotary knife 10 is constructed in accordance with a preferred embodiment of the present invention. The illustrated rotary knife 10 is particularly well suited for use in meat processing facilities, although other knife applications are entirely within the ambit of the present invention. The illustrated rotary knife 10 is preferably pneumatically powered by a pressurized air source (not shown) such as an air compressor. However, the principles of the present invention are equally applicable to embodiments in which the rotary knife is driven by alternative external power sources, such as sources that transmit power through hydraulic power or electrical power.

In the illustrated embodiment, the rotary knife 10 broadly includes a frame 12, a blade housing 14, and an annular blade 16. The frame 12 preferably includes a grip housing 18 and a head or blade housing support 20.

The blade housing 14 is preferably configured to rotatably support the blade 16 on the frame 12 for rotation about a central axis $A_{rot}$. The blade housing support 20 releasably supports the blade housing 14. More particularly, as will be discussed in greater detail below, the blade housing support 20 is configured to compressibly engage and thereby securely clamp the blade housing 14 in an adjustable operating position.

The grip housing 18 preferably has a generally cylindrical shape and extends between a proximal connector end 22 and a distal pinion end 24. The connector end 22 is configured for quick connection to a power source (not shown) such as a pneumatic supply. The grip housing 18 also preferably presents an internal passage (not shown) that houses a pneumatic motor (not shown).

Although the frame 12 and, more particularly, the grip housing 18 of the illustrated embodiment, is shown in a handle-like configuration for human grasping, it is consistent with the principles of the present invention for the frame to be alternatively configured to facilitate automated function. For instance, the grip housing might alternatively be configured to be received in or attached to a robotic arm. Furthermore, the grip housing may alternatively be configured to contain an electric motor (not shown), if desired.

The grip housing 18 preferably defines a proximal end 26 of the frame 12. Conversely, the blade housing support 20 preferably defines a distal end 28 of the frame 12.

In a preferred embodiment, the blade 16 broadly includes a circumferentially extending wedge 30 defining a smooth, sharp cutting edge 32. The blade 16 further preferably includes a ring gear 34 adjacent the wedge 30 and opposite the cutting edge 32. The wedge 30, the cutting edge 32, and the ring gear 34 each preferably extend continuously circularly about the central axis $A_{rot}$. In operation, axial movement of the knife 10 in the direction of the cutting edge 32, particularly while the blade 16 (and the cutting edge 32) is rotating, enables cutting of the meat or other material to be processed. More particularly, engagement of the rotating cutting edge 32 and wedge 30 against the material results in cutting thereof.

Although the above-described blade configuration is preferred, it is permissible according to some aspects of the present invention for alternative types of blades to be provided. Among other things, for instance, the blade might instead include an abrasive or gritted edge, a bristled edge, or a brush-type shredding edge.

As noted previously, rotation of the blade 16 is preferably powered. More particularly, the knife 10 preferably includes a drive pinion or pinion gear 36 rotatably driven by means of the aforementioned power source. The pinion 36 preferably includes a stub shaft (not shown) projecting proximally through the blade housing support 20 to interconnect with and be rotatably powered by the pneumatic motor (not shown). The pinion 36 also preferably includes a plurality of pinion teeth 38. The ring gear 34 preferably includes a plurality of ring gear teeth 40. The pinion teeth 38 preferably engage the ring gear teeth 40 such that the pinion 36 drivingly engages the ring gear 34. Rotation of the pinion 36 thus drives rotation of the ring gear 34, the wedge 30, and the cutting edge 32 of the blade 16 about the central axis $A_{rot}$.

Preferably, the knife 10 includes a bushing 42 disposed between the blade housing 14 and the blade 16. In a broad sense, the bushing 42 enables supported rotation of the blade 16 relative the frame 12. More particularly, in a preferred embodiment, the blade housing 14 defines a blade housing race 44. The blade 16 defines a blade race 46. The bushing 42 is operably positioned between the blade housing race 44 and the blade race 46. That is, in a preferred embodiment, the bushing 42 circumscribes the blade 16 and is cooperatively received by the races 44 and 46.

The bushing 42 preferably comprises a main bushing body 48 and a ridge 50 extending radially inwardly from the main bushing body 48. The bushing body 48 preferably presents a radially outer bushing face 52 engaging the blade housing race 44. Furthermore, as best shown in FIGS. 10 and 14, the ridge 50 is preferably received in the blade race 46.

Figure 10:
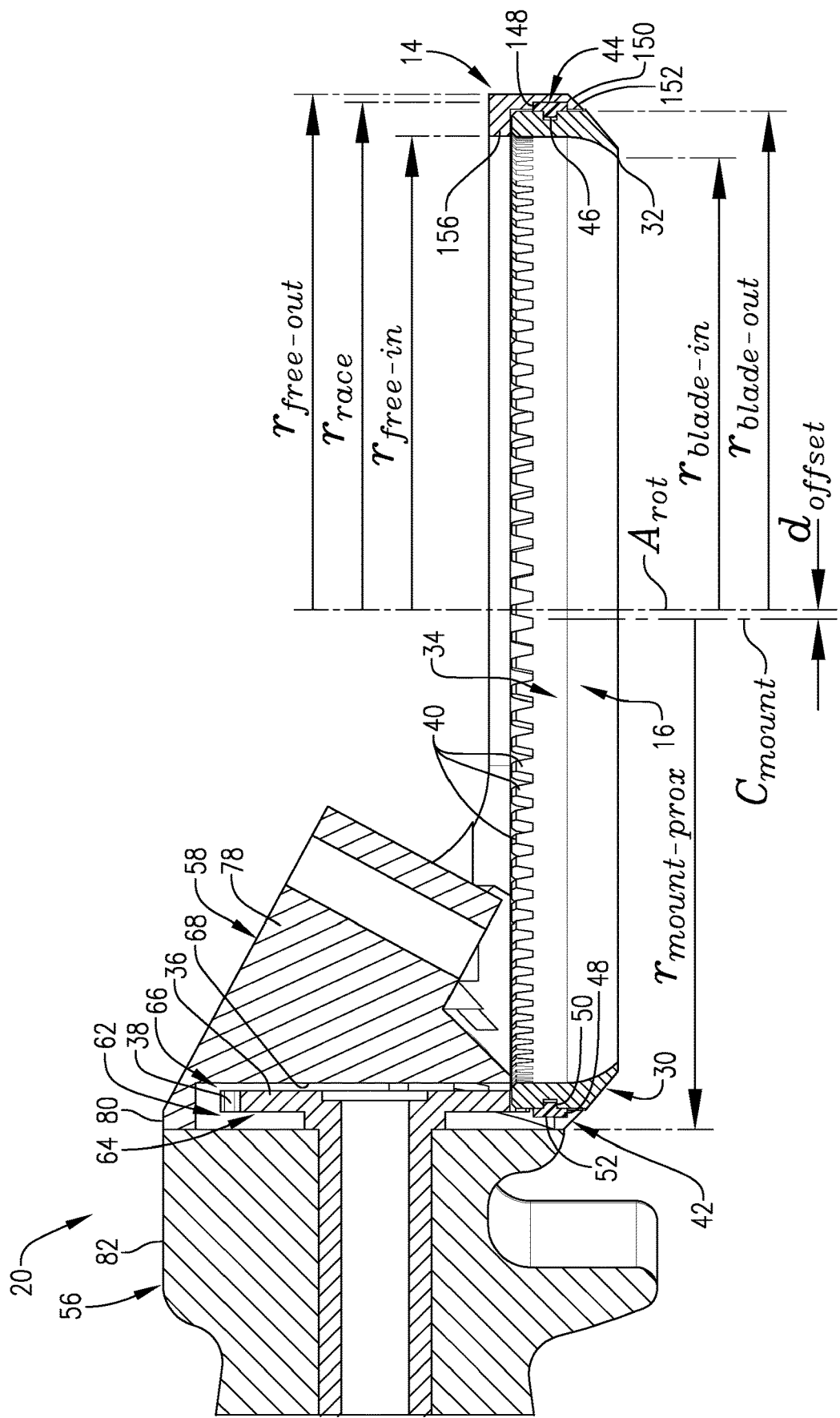
FIG. 10 is a cross-sectional view of the rotary knife taken along line 10-10 of FIG. 8, particularly illustrating the radii and circular center points of the different portions of the blade housing.

In a preferred embodiment, as also best shown in FIGS. 10 and 14, the blade race 46 preferably presents a radial depth that is slightly greater than the radial dimension of the bushing ridge 50. Such relative sizing preferably accommodates manufacturing tolerances.

The bushing 42 preferably extends at least substantially continuously between a pair of circumferentially spaced apart ends 54. Furthermore, the bushing 42 is preferably elastically or resiliently deformable. Such material properties, combined with the presence of the ends 54, enables expansion of the bushing 42 for assembly onto the blade 16. That is, the ends 54 may be urged away from each other to expand the bushing 42 for fitting or assembly into the blade race 46. After placement about the blade 16, the ends 54 preferably retract again toward each other to provide a compressive spring force favoring retention of the bushing 42 in the blade race 46. In a retracted state, the ends 54 are preferably spaced from each other between about one-tenth of an inch (0.1") and about three-tenths of an inch (0.3").

However, alternative spacing is allowed within the ambit of the present invention, with preferred spacing largely being a function of the material properties and overall size of the bushing and blade.

The bushing 42 preferably comprises an acrylonitrile butadiene styrene (ABS) plastic or an acetal plastic such as Delrin®. However, the bushing may alternatively comprise an alternative plastic or other metallic or non-metallic materials. Yet further, the bushing might in whole or in part be provided with an outermost layer of brass, composite, aluminum, or stainless steel (by means of coating, adhesion, etc.) as deemed suitable for surface-to-surface engagement with the blade and the blade housing. For instance, a base of plastic with an overlay of a composite material might in some embodiments provide an optimal surface for low-friction bearing engagement. It is noted, however, that such an outer layer might alternatively or additionally be provided for purposes of corrosion resistance, other performance characteristics, aesthetics, etc.

Although a bushing and dual race (i.e., inner and outer) configuration as illustrated and described is preferred, it is permissible according to some aspects of the present invention for such features to be alternatively designed. For instance, multiple bushings and races might be provided, or non-circular profiles might be defined. The bushing might instead be replaced by a ball bearing or other friction-reducing structure, as well. Preferred alternative configurations are disclosed in U.S. Pat. No. 8,037,611, issued Oct. 18, 2011, and entitled ROTARY KNIFE WITH BLADE BUSHING. Additional preferred alternative configurations are disclosed in U.S. patent application Ser. No. 13/283,324, filed Oct. 27, 2011, now U.S. Pat. No. 8,893,391 and entitled ROTARY KNIFE WITH MECHANISM FOR CONTROLLING BLADE HOUSING. Each of the above-referenced documents is incorporated in its entirety by reference herein.

Yet further, according to some aspects of the present invention, the bushing may be eliminated altogether. That is to say, certain principles of the present invention encompass the blade being supported directly on the housing, with the blade and housing having interengaging races in direct, slidable contact with one another.

Blade Housing Support

The blade housing support 20 preferably includes a pinion housing 56 and a pinion cover 58, which are releasably interconnected by fasteners 60. The blade housing 14, the pinion housing 56, and the pinion cover 58 preferably cooperatively define a pinion-receiving chamber 62 (see, for instance, FIG. 10) that at least substantially receives the previously described drive pinion 36.

Figure 1:
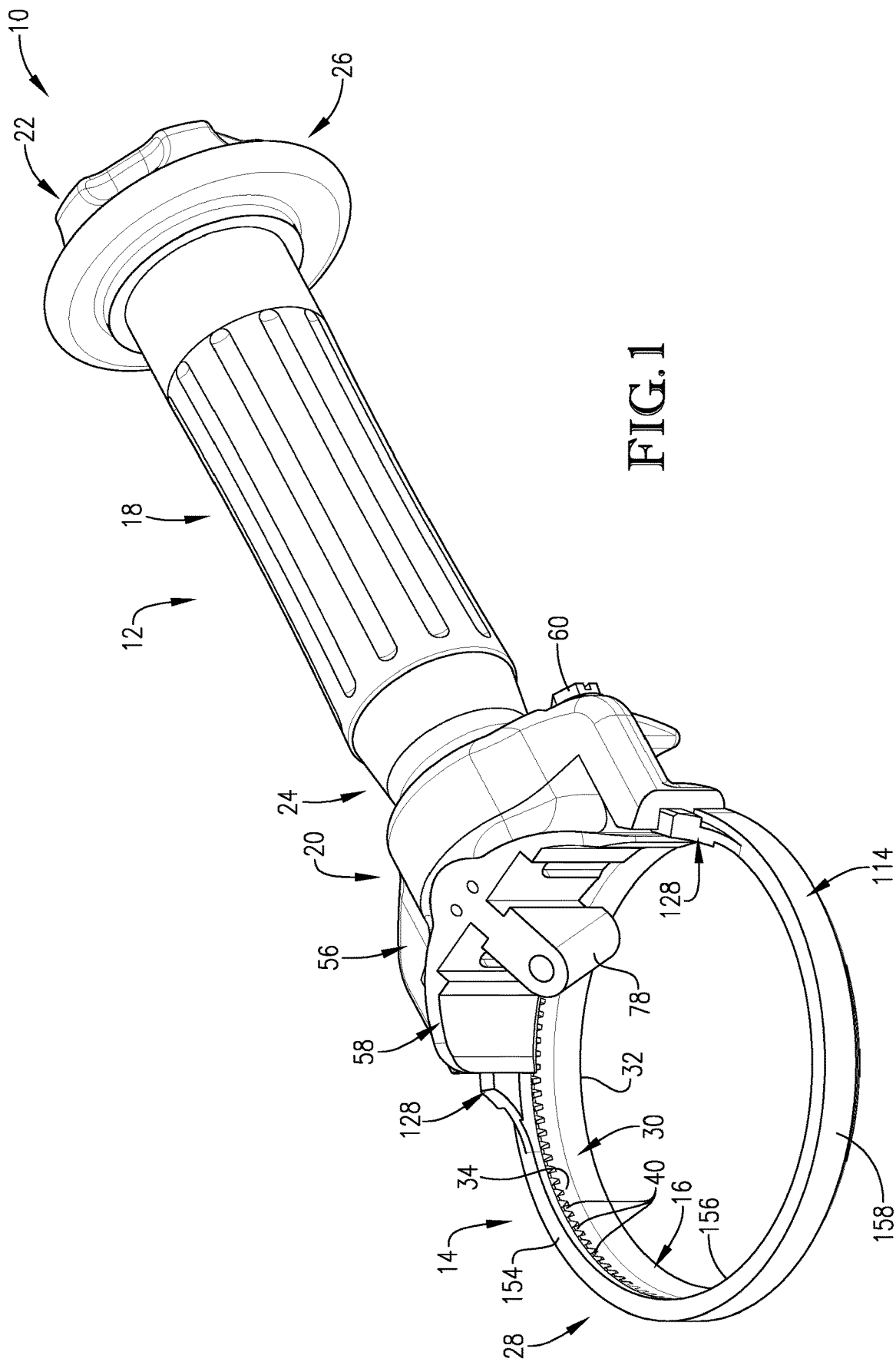
FIG. 1 is an upper perspective view of a rotary knife constructed in accordance with a preferred embodiment of the present invention.
Figure 2:
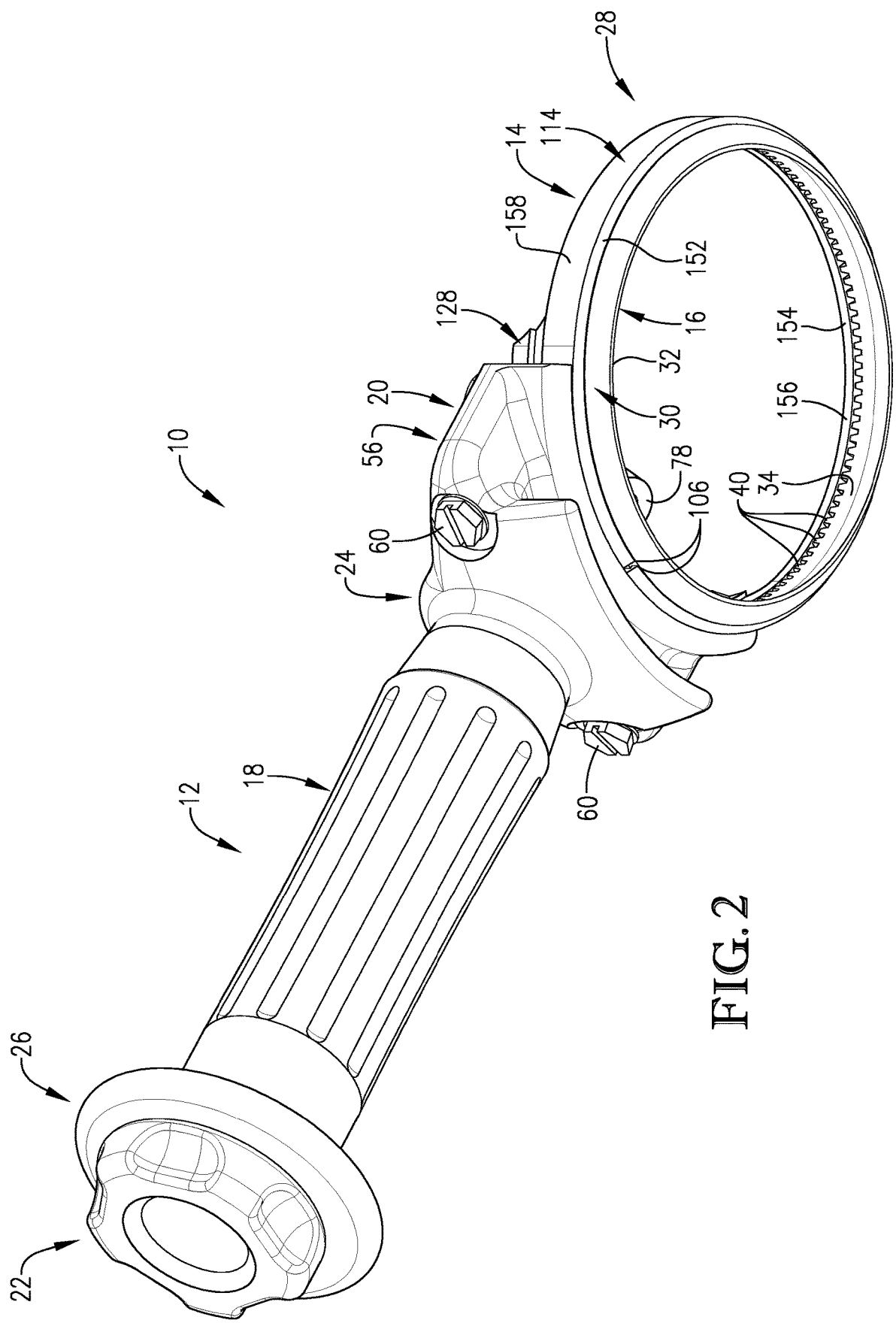
FIG. 2 is a lower perspective view of the rotary knife shown in FIG. 1.
Figure 3:
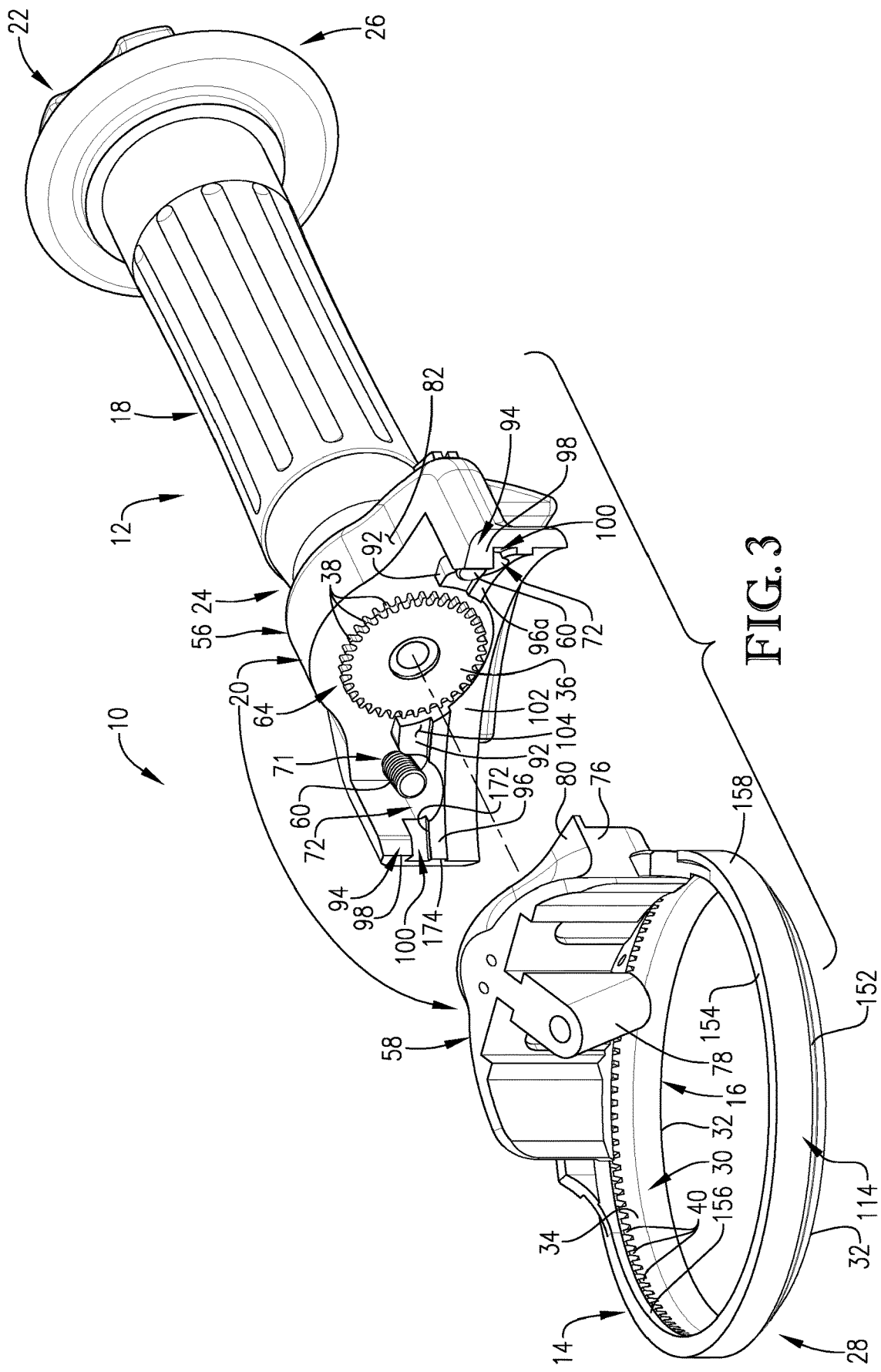
FIG. 3 is an upper perspective view of the rotary knife shown in FIGS. 1 and 2, but showing the pinion cover, blade housing, and blade exploded away from the pinion housing to depict the pinion and the clamping surface of the pinion housing.
Figure 4:
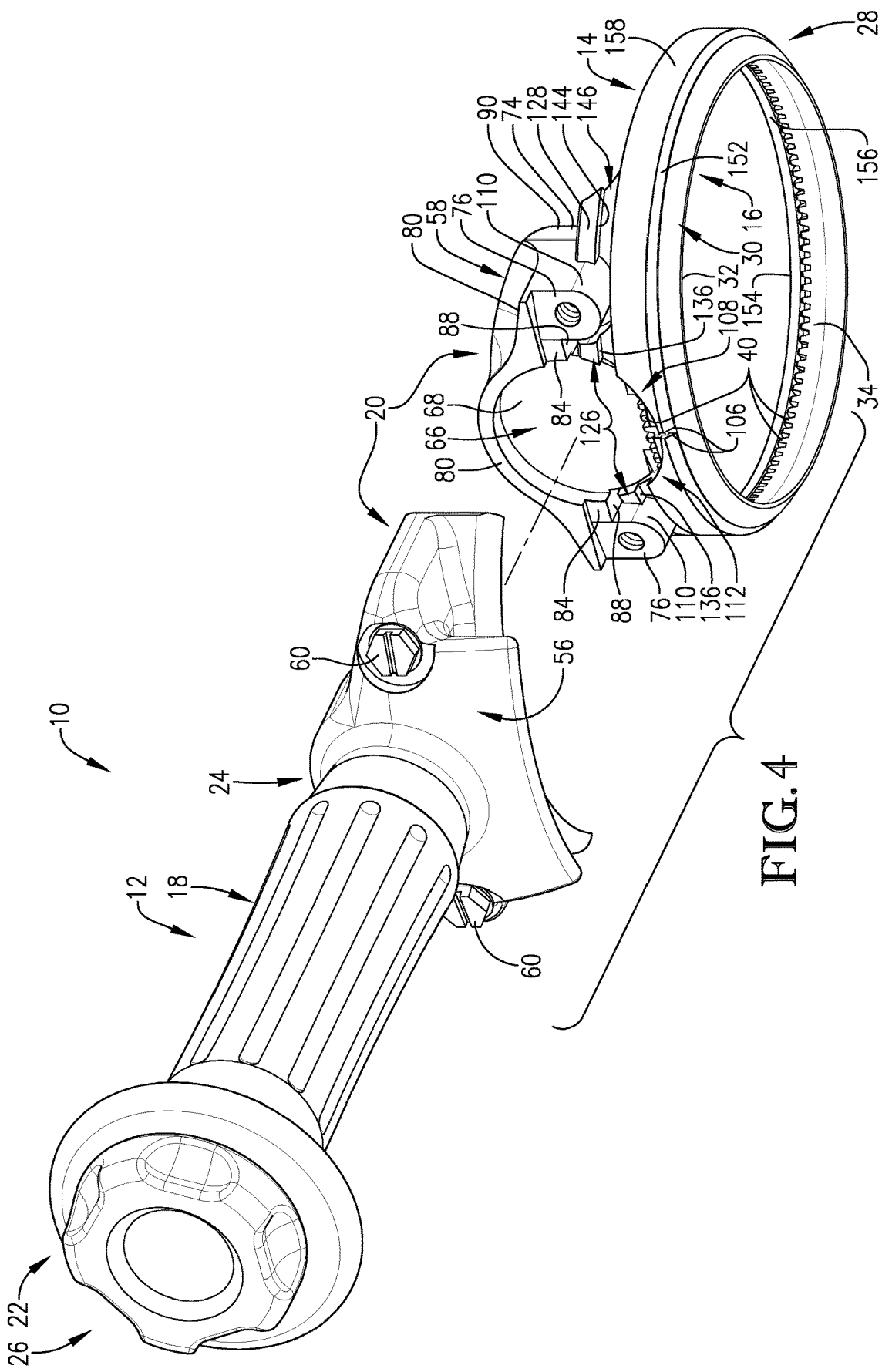
FIG. 4 is a lower perspective view of the rotary knife in the same exploded condition shown in FIG. 3.

More particularly, as perhaps best shown in FIGS. 3 and 5, the pinion housing 56 preferably defines a central pinion-receiving socket 64. The socket 64 is preferably sized to receive and permit rotation of the pinion 36. As shown in FIGS. 4, 6, and others, the pinion cover 58 preferably defines a pinion-receiving recess 66 sized and shaped to complement the pinion-receiving socket 64 of the pinion housing 56. More particularly, the pinion-receiving socket 64 and the pinion-receiving recess 66 preferably cooperatively receive the pinion 36 such that it is at least substantially enclosed within the blade housing support 20.

The pinion-receiving recess 66 is preferably in part defined by a pinion-opposing platform 68 of the pinion cover 58. The pinion-opposing platform 68 is preferably in the shape of a truncated or segmented circle to avoid interference with the ring gear 34 (see, for instance, FIG. 6). That is, the pinion-opposing platform 68 preferably presents a bottom edge 70 that in part defines the pinion-receiving recess 66 and past which the pinion 36 extends to drivingly engage the ring gear 34.

The pinion-opposing platform 68 preferably extends at least substantially parallel to the pinion 36, although relative skew is permissible according to some aspects of the present invention.

The pinion housing 56 preferably defines a pair of fastener-receiving holes 71 and a corresponding pair of boss-receiving sockets 72 at least substantially aligned with the fastener-receiving holes 71.

The pinion cover 58 preferably includes a curved wall 74 and a pair of internally-threaded fastener-receiving bosses 76 that are integrally formed with the wall 74. The boss-receiving sockets 72 preferably receive the bosses 76 and thereby facilitate proper positioning of the pinion cover 58 relative to the pinion housing 56. Furthermore, the fasteners 60 preferably extend through the fastener-receiving holes 71 of the pinion housing 56 and into the bosses 76 of the pinion cover 58 to secure the pinion housing 56 and the pinion cover 58 to each other.

The pinion-receiving socket 64 is preferably disposed circumferentially between the boss-receiving sockets 72. Similarly, the pinion-receiving recess 66 is preferably disposed circumferentially between the bosses 76.

Preferably, the pinion cover 58 includes a blade steeling mount 78 configured to support a standard steeling component (not shown).

The pinion cover 58 further preferably includes a roof 80 extending toward the pinion housing 56. After assembly of the blade housing support 20, the roof 80 preferably abuts a top surface 82 of the pinion housing 56 adjacent each of the boss-receiving sockets 72.

The pinion cover 58 also preferably includes a pair of blocks 84 disposed below the roof 80. Each block 84 is preferably positioned between a corresponding one of the bosses 76 and the pinion-receiving recess 66. The blocks 84 and the roof 80 preferably cooperate with the previously described pinion-opposing platform 68 to define the pinion-receiving recess 66.

Still further, the pinion cover 58 preferably defines a generally circumferentially extending shelf 86 (see FIG. 6) extending generally circumferentially from the pinion-opposing platform 68. As will be discussed in greater detail below, each block 84, the adjacent boss 76, an adjacent portion of the shelf 86, and a side face 68a (FIG. 6) of the pinion-opposing platform 68 cooperatively define a recess 88. Furthermore, the shelf 86 and portions of the curved wall 74 cooperatively at least substantially define an arcuate, discontinuous, convex distal clamping surface 90. The function of the distal clamping surface 90 will be discussed in greater detail below.

As will also be discussed in greater detail below and as shown in FIG. 3 and others, the pinion housing 56 preferably includes a pair of inner platforms 92 and a pair of outer brackets 94 arcuately outwardly spaced from respective ones of the platforms 92. The pinion housing 56 also preferably includes a generally arcuately and inwardly extending rib 96. The rib 96 preferably in part defines the inner platforms 92 and the outer brackets 94, although alternative formation or placement is permissible according to some aspects of the present invention.

Preferably, the inner platforms 92 in part define the pinion-receiving socket 64 therebetween. Corresponding pairs of the inner platforms 92 and the outer brackets 94 preferably at least in part define the boss-receiving sockets 72 therebetween.

The brackets 94 each preferably include a positioning block 98 spaced axially from the rib 96 such that the rib 96 and the positioning block 98 define a positioning recess 100 therebetween.

Yet further, as also shown in FIG. 3, the pinion housing 56 preferably includes an arcuate, concave facade 102 disposed below the rib 96. The facade 102, the inner platforms 92, and the outer brackets 94 (including the rib 96) preferably cooperatively at least substantially define an arcuate, concave proximal clamping surface 104 projecting in opposite circumferential directions relative to the pinion-receiving socket 64. The function of the proximal clamping surface 104 will be discussed in greater detail below.

Blade Housing

As noted previously, the blade housing 14 is configured to rotatably support the blade 16 on the frame 12 for rotation about the central axis $A_{rot}$. The blade housing 14 is preferably generally annular in form and complements relevant portions of the blade housing support 20 and the blade 16, as will be discussed in greater detail below. As will also be discussed in greater detail below, such annular form is preferably generally smooth. That is, the blade housing 14 preferably comprises one or more generally arcuate sections. It is particularly noted, however, that certain aspects of the present invention are equally applicable to annular blade housing constructions presenting either or both of smooth (e.g., circular and/or elliptical) and jagged (e.g., sharply transitioning and/or polygonal) contours.

Preferably, the blade housing 14 is substantially unitary. Furthermore, the blade housing 14 is preferably split to define the spaced-apart circumferential ends 106. The ends 106 preferably facilitate at least the substantially elastic (i.e., resilient) expansion and contraction. In the illustrated embodiment, the blade housing 14 shifts between a relatively contracted blade-securing condition and a relatively expanded blade-releasing condition. Preferably, the ends 106 are spaced from each other less than about three-tenths of an inch (0.3").

The blade housing 14 preferably defines a pinion-receiving well 108 and a pair of boss portals 110 spaced on opposite arcuate sides of the pinion-receiving well 108. More particularly, as best shown in FIGS. 4-6, the pinion-receiving well 108 is preferably in the form of a truncated circle that complements and completes the truncated circle defined by the pinion-receiving recess 66 of the pinion cover 58. The pinion-receiving well 108, the pinion-receiving socket 64, and the pinion-receiving recess 66 thereby cooperatively define the pinion-receiving chamber 62 (FIG. 10) that at least substantially receives the pinion 36.

As perhaps best shown in FIG. 4, a (shiftable) segment 112 of the ring gear 34 of the blade 16 extends into the pinion-receiving chamber 62 to be drivingly engaged by the pinion 36. Thus, engagement of the ring gear 34 by the pinion 36 preferably occurs in an at least substantially enclosed, protected space. Such enclosed configuration both restricts ingress of contaminants into the intermeshing regions of the pinion 36 and the ring gear 34 and also provides a measure of protection against incidental contact with said intermeshing regions by a user.

The boss portals 110 preferably correspond to the aforementioned boss-receiving sockets 72 of the pinion housing 56. The bosses 76 extend through corresponding ones of the boss portals 110 toward the boss-receiving sockets 72.

Preferably, the blade housing 14 includes a main body 114 presenting axially spaced apart upper and lower margins 116 and 118. The main body 114 preferably includes an upper surface 120 extending along the upper margin 116. The main body 114 further preferably includes opposite annular radially inner and radially outer surfaces 122 and 124, respectively.

The blade housing 14 further preferably includes a pair of arcuately spaced apart inner projections 126 and a pair of arcuately spaced apart outer projections 128, each extending upwardly from the upper surface 120 of the main body 114. The inner projections 126 preferably cooperate with the main body 114 to define the pinion-receiving well 108. The outer projections 128 are spaced arcuately outwardly of the inner projections 126. Corresponding pairs of the inner and outer projections 126 and 128 preferably cooperate with the main body to define the boss portals 110. However, it is permissible according to some aspects of the present invention for the pinion-receiving well 108 and the boss portals 110 to be purely recessed within the main body (i.e., not defined in part by structure above the main body) or entirely defined by the inner and outer projections (i.e., not defined in whole or in part by the main body).

The inner projections 126 each preferably comprise an axially extending neck 130 and a head 132 extending both generally radially inwardly and generally radially outwardly from the neck 130, opposite the upper surface 120 of the main body 114. The heads 132 each thus preferably define radially inner and radially outer cantilevered faces 134 and 136, respectively.

Similarly, the outer projections 128 each preferably comprise an axially extending neck 138 and a head 140 extending both generally radially inwardly and generally radially outwardly from the neck 138, opposite the upper surface 120 of the main body 114. The heads 140 each thus preferably define radially inner and radially outer cantilevered faces 142 and 144, respectively.

As shown in FIG. 6 and others, the necks 130 and 138, the heads 132 and 140, and the upper surface 120 of the main body 114 thereby cooperatively define a discontinuous, generally arcuately extending radially outer blade housing groove 146. The function of the groove 146 will be discussed in greater detail below.

The blade housing 14, as noted previously, defines the blade housing race 44 that receives the bushing 42. More particularly, the blade housing 14 includes axially spaced apart, inwardly projecting upper and lower lips 148 and 150 that define the blade housing race 44. Preferably, the blade housing 14 includes an inwardly tapered portion 152 extending from the main body 114 at the lower margin 118. The tapered portion 152 preferably defines the lower lip 150.

The bushing body 48 has a radial thickness. The upper and lower lips 148 and 150 preferably extend inwardly a distance at least substantially equal to the radial thickness of the bushing body 48, such that the bushing body 48 is at least substantially received between the upper and lower lips 148 and 150 (see FIGS. 10 and 14).

The blade housing 14 further preferably includes an overhang 154 that extends inwardly so as to extend beyond the bushing 42. More particularly, the overhang 154 preferably extends inwardly so as to completely or at least substantially overhang the ring gear 34. Such an overhanging configuration not only restricts ingress of contaminants into the ring gear 34 but also provides a measure of protection against incidental contact by a user with the rotating teeth 40 of the ring gear 34.

Preferably, the heads 132 and 140 and the necks 130 and 138 of the inner and outer projections 126 and 128 cooperate with the main body 114 (including the upper and lower lips 148 and 150, the overhang 154, and the blade housing race 44) to present a radially inner annular face 156 of the blade housing 14. Furthermore, the heads 132 and 140, the necks 130 and 138, and the main body 114 cooperatively preferably present a radially outer annular face 158 of the blade housing 14. The inner and outer annular faces 156 and 158 of the blade housing 14 are preferably opposite each other.

Assembly Overview

The blade housing support 20 is preferably configured to compressibly engage and thereby securely clamp the blade housing 14 in an adjustable operating position. More particularly, as will be discussed in greater detail below, the blade housing 14 preferably includes opposite proximal (radially outer) and distal (radially inner) circumferentially extending mounting surfaces 160 and 162, respectively, that are engaged by the blade housing support 20.

The pinion housing 56 and the pinion cover 58 preferably serve as clamping components that compressibly engage the blade housing 14 along the mounting surfaces 160 and 162 to secure the blade housing 14 to the frame 12. That is, the previously described distal clamping surface 90 of the pinion cover 58 preferably faces in opposition to the previously described proximal clamping surface 104 of the pinion housing 56. The blade housing 14 is positioned and secured between the pinion housing 56 and the pinion cover 58 via engagement of the proximal and distal mounting surfaces 160 and 162 with respective ones of the proximal and distal clamping surfaces 104 and 90.

Figure 11:
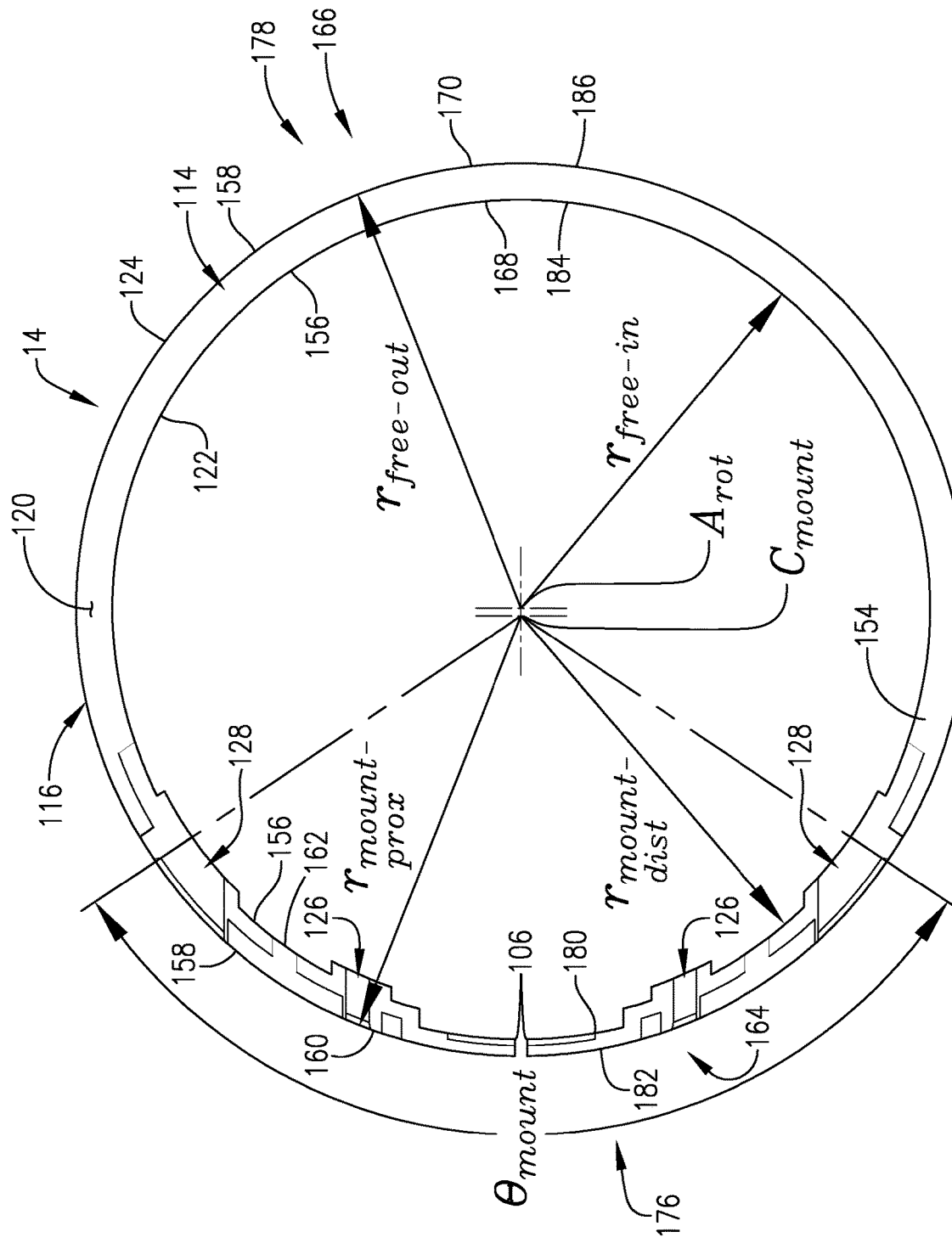
FIG. 11 is a top elevation view of only the blade housing of the rotary knife, illustrating the radii and circular center parts of the different portions of the blade housing.
Figure 12:
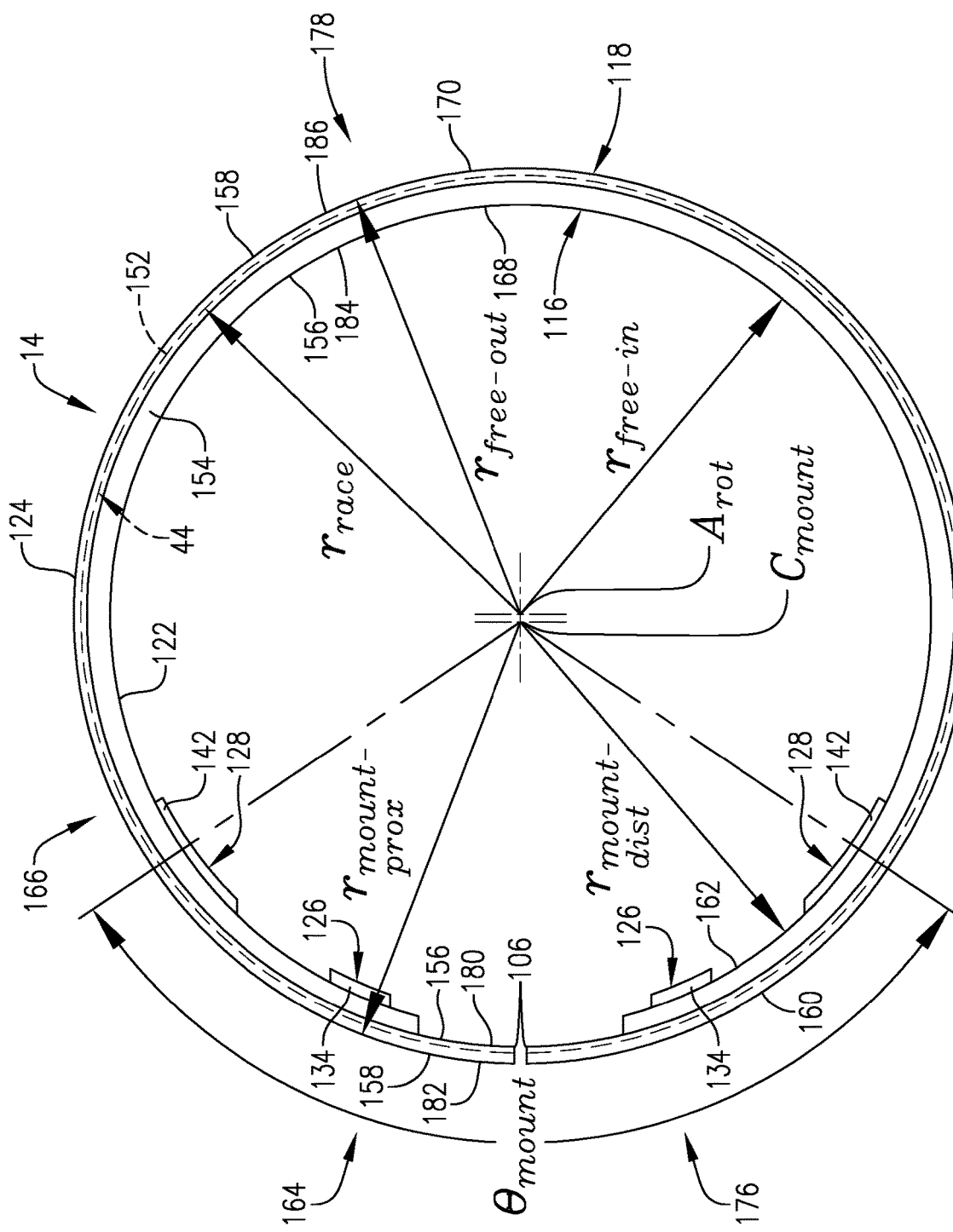
FIG. 12 is a bottom elevation view of only the blade housing of the rotary knife, illustrating the radii and circular center parts of the different portions of the blade housing.

More particularly, as shown in FIGS. 11, 12, and others, the blade housing 14 includes the mounting portion 164 and a free or remaining portion 166. The mounting portion 164 preferably comprises portions of the main body 114, of the lips 148 and 150, and of the inner and outer projections 126 and 128 associated with mounting of the blade housing 14 to the frame 12. The free portion 166 preferably comprises remaining portions of the main body 114, of the lips 148 and 150, and of the outer projections 128 (i.e., portions of the blade housing 14 that are not part of the mounting portion 164).

The mounting portion 164 defines both of the aforementioned proximal and distal mounting surfaces 160 and 162. The free or remaining portion 166 defines opposite arcuate or circumferential proximal (radially inner) and distal (radially outer) free or remaining surfaces 168 and 170. The proximal and distal remaining surfaces 168 and 170 are preferably formed continuously with the distal and proximal mounting surfaces 162 and 160, respectively. That is, in a preferred embodiment, the radially inner annular face 156 of the blade housing 14 defines both the distal (radially inner) mounting surface 162 and the proximal (radially inner) free surface 168. The radially outer annular face 158 of the blade housing 14 defines both the proximal (radially outer) mounting surface 160 and the distal (radially outer) free surface 170.

As shown in FIGS. 11 and 12, the proximal and distal mounting surfaces 160 and 162 are preferably defined along respective arcs of a circle having an angular dimension $\theta_{mount}$. Although such correlation is not required according to some aspects of the present invention, the angular dimension $\theta_{mount}$ preferably at least substantially corresponds to the angular extents of the proximal and distal clamping surfaces 104 and 90.

Preferably, the angular dimension $\theta_{mount}$ is between about sixty degrees (60°) and about one hundred eighty degrees (180°). Most preferably, the angular dimension $\theta_{mount}$ is about one hundred ten degrees (110°).

With further regard to engagement of the blade housing 14 and the frame 12, the heads 132 of the inner projections 126 of the blade housing 14 are preferably received in corresponding ones of the recesses 88 defined below the blocks 84 of the pinion cover 58 so as to engage the curved wall 74. The outer projections 128 engage the wall 74 arcuately outside the bosses 76.

Preferably, both the inner and outer projections 126 and 128 of the blade housing 14 are axially spaced from the shelf 86 of the pinion cover 58. More particularly, the inner cantilevered faces 142 and 144 are preferably spaced from the shelf 86. Engagement is permissible according to some aspects of the present invention, however; and the shelf 86 preferably nonetheless serves to restrict undue shifting of the housing 14 should slippage from ideal positioning occur.

The heads 132 and 140 and the necks 130 and 138 of the inner and outer projections 126 and 128 of the blade housing 14 thereby engage the distal clamping surface 90 defined by the pinion cover 58. Alternatively stated, the distal mounting surface 162 of the blade housing 14 engages the distal clamping surface 90 of the pinion cover 58.

It is noted, as well, that the adjacent, circumferentially spaced apart sides of each corresponding pair of inner and outer projections 126 and 128 are preferably shaped to correspond to the shape of the relevant boss 76. That is, a tight or transition fit of each boss 76 in the corresponding boss portal 110 is preferably achieved.

With continued regard to the clamping functionality, as shown in FIG. 5 and others, the inner platforms 92 of the pinion housing 56 preferably correspond to the inner projections 126 of the blade housing 14. The outer brackets 94 preferably correspond to the outer projections 128 of the blade housing 14. The inner projections 126 at least in part overlie and engage corresponding ones of the inner platforms 92, while the outer projections 128 overlie and engage corresponding ones of the outer brackets 94.

More particularly, the rib 96 is preferably received in the groove 146, with the heads 132 and 140 of each of the inner and outer projections 126 and 128 engaging an upper surface 172 of the rib 96. A lower surface 174 of the rib 96 engages the upper surface 120 of the main body 114 of the blade housing 14 (see FIG. 3). Furthermore, the heads 140 of the outer projections 128 are received in the corresponding positioning recesses 100. Yet further, as best illustrated in FIG. 14, the radially outer surface 124 of the main body 114 engages the facade 102 of the pinion housing 56.

Preferably, as shown in FIG. 5, a radial gap 175 is defined between the blade housing 14 and a radially inner surface 96a of the rib 96. It is permissible according to some aspects of the present invention, however, for contact to occur therebetween.

Thus, the proximal mounting surface 160 of the blade housing 14 engages the proximal clamping surface 104 of the pinion housing 56 of the frame 12.

Furthermore, the heads 132 and 140 and the necks 130 and 138 of the inner and outer projections 126 and 128 of the blade housing 14 thereby engage the distal clamping surface 90 defined by the pinion cover 58. Alternatively stated, the distal mounting surface 162 of the blade housing 14 engages the distal clamping surface 90 of the pinion cover 58.

As will be apparent to one of ordinary skill in the art, in the illustrated embodiment, tightening of the fasteners 60 will result in increased compressive forces applied by the proximal and distal clamping surfaces 104 and 90, respectively, to the blade housing 14. That is, tightening of the fasteners 60 will increasingly securely fix the blade housing 14 in the frame 12.

In contrast, the blade housing 14 preferably may be efficiently removed from the frame 12 upon loosening of the fasteners 60. More particularly, the pinion cover 58 may be shifted away from the pinion housing 56 to allow axial shifting and disengagement of the blade housing 14. The blade housing 14 can then be expanded from the previously described blade-securing condition to the previously described blade-releasing condition. The blade 16 can then be removed for maintenance (e.g., cleaning and/or sharpening) or replacement.

Preferably, the frame 12, the blade housing 14, and the blade 16 each comprise an oxidation- and corrosion-resistant material such as tempered steel in order to suitably tolerate the adverse environment associated with a preferred embodiment of the present invention. However, other metallic or non-metallic materials, including those that are neither oxidation-nor corrosion-resistant, may be used on one or more of the frame, the blade housing, and the blade or portions thereof. For instance, brass, aluminum, ceramic, or stainless steel may alternatively be used. It is also preferable that consideration be made with regard to compatibility of adjacent materials when selecting materials. For instance, the blade might largely comprise tempered steel but be in whole or in part coated with an outer layer of brass, aluminum, or stainless steel that is suitable for surface-to-surface engagement with the adjacent surfaces of the blade housing.

Geometry of Blade and Blade Housing Relative to Clamping Surfaces of Frame

As noted previously, the blade 16 is rotatable about the central axis $A_{rot}$. The blade 16 is also preferably geometrically centered about the central axis $A_{rot}$. More particularly, the blade 16 extends along a circle centered on the central axis $A_{rot}$ so as to present outer and inner radii $r_{blade\_out}$ and $r_{blade\_in}$. That is, the wedge 30, the cutting edge 32, and the ring gear 34 each extend circularly about the central axis $A_{rot}$. Furthermore, the blade 16 is preferably rotationally symmetrical.

Similarly to the blade 16, the blade housing race 44 of the blade housing 14 and the blade race 46 of the blade 16 are defined along respective circles centered on the central axis $A_{rot}$. As shown in FIGS. 9-13, for instance, the blade housing race 44 is disposed along a circle centered on the axis $A_{rot}$ and having a radius $r_{race}$. Likewise, the bushing 42 received in the blade race 46 and the blade housing race 44 extends circularly about the central axis $A_{rot}$.

The free or remaining portion 166 of the blade housing 14 also preferably extends along a circle centered on the central axis. That is, the radially inner and radially outer free or remaining surfaces 168 and 170 are defined along a circular arc about the central axis $A_{rot}$. More particularly, the radially inner free surface 168 presents a radius $r_{free\_in}$ about the axis $A_{rot}$, and the radially outer free surface 170 presents a radius $r_{free\_out}$ about the axis $A_{rot}$. As previously noted, however, the remaining portion 166 of the housing 14 (apart from the race 44) may have alternative shapes and geometric centerpoints, without departing from the spirit of the present invention.

In contrast, however, as best shown in FIGS. 9-13, the proximal and distal mounting surfaces 160 and 162 of the mounting portion 164 of the blade housing 14 extend along respective circles having a center point $C_{mount}$ that is spaced from (i.e., offset from) the central axis $A_{rot}$. Likewise, the proximal and distal clamping surfaces 104 and 90 are defined along circular arcs about the offset center point $C_{mount}$. More particularly, the proximal mounting surface 160 presents a radius $r_{mount\_prox}$ about the center point $C_{mount}$, and the distal mounting surface 162 presents a radius $r_{mount\_dist}$ about the center point $C_{mount}$.

Thus, the proximal and distal clamping surfaces 104 and 90 and the proximal and distal mounting surfaces 160 and 162 are eccentric relative to the blade 16, the blade race 46, the blade housing race 44, the bushing 42, and the radially inner and radially outer free surfaces 168 and 170.

In a preferred embodiment, the radially inner and radially outer annular faces 156 and 158 of the blade housing 14 cooperatively present a broadly-defined blade housing proximal-most end 176 in contact with the frame 12 and a broadly-defined blade housing distal-most end 178 spaced from the frame 12. The proximal-most end 176 of the blade housing 14 is preferably spaced from the central axis $A_{rot}$ a first distance and the distal-most end 178 of the blade housing 14 is spaced from the central axis $A_{rot}$ a second distance, wherein the first distance is different than the second distance. In a preferred embodiment, the first distance is greater than the second distance.

More precisely, as best shown in FIG. 13, the proximal-most end 176 preferably presents proximal-most radially inner and radially outer faces 180 and 182, respectively. Preferably, the distal (radially inner) mounting surface 162 is defined by part of the proximal-most radially inner face 180. The proximal (radially outer) mounting surface 160 preferably is defined by part of the proximal-most radially outer face 182.

As also shown in FIG. 13, the distal-most end 178 preferably presents distal-most radially inner and radially outer faces 184 and 186, respectively. Preferably, the proximal (radially inner) free or remaining surface 168 is defined by part of the distal-most radially inner face 184. The distal (radially outer) free or remaining surface 170 preferably is defined by part of the distal-most radially outer face 186.

With continued reference to FIG. 13, the proximal-most radially inner face 180 is spaced from the central axis $A_{rot}$ a first distance $d_{prox\_in}$ that is greater than a distance $d_{dist\_in}$ that defines the space between the central axis $A_{rot}$ and the distal-most radially inner face 184. Likewise, the proximal-most radially outer face 182 is spaced from the central axis $A_{rot}$ a first distance $d_{prox\_out}$ that is greater than a distance $d_{dist\_out}$ that defines the space between the central axis $A_{rot}$ and the distal-most radially outer face 186.

As noted previously, and as will be readily apparent to one of ordinary skill in the art based on the above-described geometry, the center point $C_{mount}$ is offset relative to the central axis $A_{rot}$. More particularly, in a preferred embodiment, the center point $C_{mount}$ is spaced proximally from the central axis $A_{rot}$ by a distance $d_{offset}$ (see FIGS. 9 and 10).

Although a variety of dimensional variations may fall within the scope of the present invention, preferred dimensional ranges are provided below. It is particularly noted, however, that actual dimensions (e.g., specific values selected from the ranges below) remain subject to the relative magnitude constraints described above, referenced below, and/or made apparent in the figures. The distances will also vary depending on the blade size, with most commercially available blades having a nominal diameter ranging between about one inch (1") and about five inches (5"). It will be appreciated that most (if not all) of the dimensions recited herein will vary proportionally depending on the blade size. In a preferred embodiment, the radius $r_{race}$ is between about one and seven-tenths inches (1.7") and one and nine-tenths inches (1.9"). The inner blade radius $r_{blade\_in}$ is preferably between about one and five-tenths inches (1.5") and about one and seven-tenths inches (1.7"). The outer blade radius $r_{blade\_out}$ is preferably between about one and seven-tenths inches (1.7") and one and nine-tenths inches (1.9"), while remaining smaller than $r_{race}$. The radii $r_{free\_in}$ and $r_{mount\_dist}$ are preferably each between about one and six-tenths inches (1.6") and about one and eight-tenths inches (1.8"), though not necessarily or even preferably equal, while also being smaller than $r_{race}$. Also larger than $r_{race}$ and perhaps varying from each other are $r_{free\_out}$ and $r_{mount\_prox}$, in a range between about one and seven-tenths inches (1.7") and one and nine-tenths inches (1.9").

As will be readily apparent to those of ordinary skill in the art, $d_{dist\_in}$ is preferably equal to $r_{free\_in}$. Likewise, $d_{dist\_out}$ is preferably equal to $r_{free\_out}$. In a preferred embodiment, $d_{prox\_in}$ is between about one and fifty-five hundredths inches (1.55") and about one and seventy-five hundredths inches (1.75"), while $d_{prox\_out}$ is between about one and seventy-five hundredths inches (1.75") and about one and ninety-five hundredths inches (1.95").

The offset distance $d_{offset}$ is preferably between about twenty thousandths of an inch (0.020") and about forty-five thousandths of an inch (0.045").

The above-described preferred blade housing 14 provides numerous advantages. Among other things, for instance, the blade housing 14 may suitably act as an adapter between a blade 16 and a frame 12 not sharing a common "focal point" (i.e., the axis of rotation $A_{rot}$ for the blade 16 versus the center point $C_{mount}$ associated with the clamping surfaces 90 and 104 of the frame 12). More particularly, in a conventional arrangement, a blade and blade housing typically both extend circularly about a shared axis. Likewise, any clamping surfaces of an associated frame that engage and support the blade housing also typically extend circularly about the same shared axis. Conventionally, should it be desirable to use an alternatively radially sized blade (i.e., a blade having a sufficiently smaller or larger radius), both an entirely new blade housing and an entirely new frame sized in accordance with the new, alternative blade would be required to ensure good support of the blade housing and blade.

In contrast, in the illustrated embodiment, the mounting portion 164 of the blade housing 14 is sized to correspond to the frame 12 in a substantially conventional manner, while the free or remaining portion 166 is sized to correspond to the blade 16 in a conventional manner. The blade 16 and the frame 12, however, are not sized to correspond to each other in a conventional manner, with the blade housing 14 (more particularly, its unique geometry defining offset axes for the mounting and remaining portions 164 and 166) enabling use of the blade 16 with the frame 12. That is, a blade 16 and a frame 12 conventionally not intended for use with each other due to varying sizes may be used together due to the facilitative features of the novel blade housing 14.

Perhaps less commonly, a blade housing in accordance with the present invention might alternatively be configured to enable the use of a blade and frame conventionally sized for use with each other but disposed about offset axes.

It is particularly noted that such facilitative features, along with the previously described designs of the blade 16, the bushing 42, and the races 44 and 46, are such that secure rotational support for the blade 16 in the blade housing 14 and, in turn, in the frame 12 is provided despite the geometric irregularities described above. That is, rotational capability is provided in addition to simple securement or support.

In practice, such adaptive capability would enable use of numerous blade sizes with a given frame, assuming a suitably eccentric blade housing were provided for the given blade. That is, each of a set of preferred blade housings might include an at least substantially identical mounting portion configured for engagement with a given frame but varying free or remaining portions each corresponding to a different blade size.

Rotary knives traditionally have a dedicated blade housing support for each size of blade and corresponding housing. With the present invention, however, a blade that is not necessarily designed for use with the housing support may nonetheless be operably supported. The inventive eccentric housing is capable of supporting the "mismatched" blade on the frame. In other words, different blades may be used with the knife without having to change the housing support. With a conventional knife, the housing support, blade housing, and blade all must be changed when a different blade size is desired.

Such adaptive capability might also be found highly advantageous in situations in which a user wishes to use a first brand's frame (configured for conventional use with a correspondingly sized blade supplied by the same first brand) with an incongruently sized blade supplied by another brand. Such a situation might arise if the second brand's blade provided a user's preferred sizing, improved cost effectiveness, better quality, desired features, etc.

As will be apparent to one of ordinary skill in the art, although the illustrated embodiment features a blade that is conventionally understood to be too small for the given frame, the present invention is equally well-suited to applications in which a blade is provided that is conventionally understood to be too large for a given frame. The relationships described above with regard to offsets, radii, and distances would vary in accordance with the exact geometric details of such an alternative blade and frame, in a manner readily apparent to one of ordinary skill in the art.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A rotary knife comprising:
    a frame;
    an annular blade; and
    a blade housing mounted to the frame, with the housing presenting a circumferential mounting surface in contact with the frame,
    said housing supporting the blade on the frame for rotation about a central axis,
    said housing including a blade-supporting race defined along a circle centered on the central axis,
    said mounting surface of the housing being defined along a circular arc with a center point spaced from the central axis, such that the blade-supporting race and mounting surface are eccentric relative to one another.

2. The rotary knife as claimed in claim 1,
    said center point being closer to the frame than the central axis is to the frame.

3. The rotary knife as claimed in claim 1,
    said housing presenting opposite inner and outer annular faces, one of said faces having a mounting portion along which the mounting surface is defined, with a remaining portion of said one of the faces being spaced from the frame.

4. The rotary knife as claimed in claim 3, said remaining portion of said one of the faces being arcuate and centered on the central axis.

5. The rotary knife as claimed in claim 4, said circular arc along which the mounting surface is defined having an angular measure of at least about 60°.

6. The rotary knife as claimed in claim 5, said angular measure being about 110°.

7. The rotary knife as claimed in claim 1, wherein said circumferential mounting surface comprises a pair of mounting surfaces, and each one of said pair of mounting surfaces comprises a respective one of opposite inner and outer annular faces.

8. The rotary knife as claimed in claim 7, said frame including clamping components that compressibly engage the mounting surfaces to releasably secure the housing to the frame.

9. The rotary knife as claimed in claim 8, said blade including a ring gear; and a rotatable pinion connectable to a power source and drivingly intermeshed with the ring gear, said clamping components including a pinion housing, in which the pinion is rotatably supported, and a pinion cover releasably interconnected with the housing.

10. The rotary knife as claimed in claim 1, said blade presenting a blade race in an opposed relationship with the blade-supporting race of the housing; and a bushing operably positioned between the races.

11. The rotary knife as claimed in claim 1, said housing being split to present spaced-apart circumferential housing ends, said blade-supporting race extending continuously between the housing ends.

12. A blade housing for a rotary knife, wherein the housing is operable to support an annular blade on a frame for rotation about a central axis, said blade housing comprising:
a circumferential mounting surface configured to contact the frame,
a blade-supporting race defined along a circle centered on the central axis,
said mounting surface of the housing being defined along a circular arc with a center point spaced from the central axis, such that the blade-supporting race and mounting surface are eccentric relative to one another,
said housing being split to present spaced-apart circumferential housing ends,
said blade-supporting race extending continuously between the housing ends.

13. The blade housing as claimed in claim 12, said housing presenting opposite inner and outer annular faces,
one of said faces having a mounting portion and a remaining portion,
said mounting surface being defined along the mounting portion.

14. The blade housing as claimed in claim 13, said remaining portion of said one of the faces being arcuate and centered on the central axis.

15. The blade housing as claimed in claim 14, said circular arc along which the mounting surface is defined having an angular measure of at least about 60°.

16. The blade housing as claimed in claim 15, said angular measure being about 110°.

17. The blade housing as claimed in claim 12, wherein said circumferential mounting surface comprises a pair of mounting surfaces, and each one of said pair of mounting surfaces comprises a respective one of opposite inner and outer annular faces.

18. A rotary knife comprising:
a frame;
an annular blade; and
a blade housing mounted to the frame,
said housing presenting opposite inner and outer annular faces,
at least one of said faces presenting a proximal-most end in contact with the frame and a distal-most end spaced from the frame,
said housing supporting the blade on the frame for rotational movement about a central axis,
said proximal-most end being spaced from the central axis a first distance, and said distal-most end being spaced from the central axis a second distance, with the distances being different.

19. The rotary knife as claimed in claim 18, said first distance being greater than the second distance.

20. The rotary knife as claimed in claim 18, said at least one of said faces having circumferentially extending portions, with a first one of the portions defining the proximal-most end and a second one of the portions defining the distal-most end,
each of said portions having a radius measured from a respective center point.

21. The rotary knife as claimed in claim 20, said center point associated with the second portion being the central axis.

22. The rotary knife as claimed in claim 21, said center point associated with the first portion being spaced from the central axis.

23. The rotary knife as claimed in claim 22, said center point associated with the first portion being closer to the frame than the central axis.

24. The rotary knife as claimed in claim 18, said at least one of said faces presenting a mounting surface that contacts the frame and defines the proximal-most end,
said mounting surface extending along a circular arc having an angular measure of at least about 60°.

25. The rotary knife as claimed in claim 24, said angular measure being about 110°.

26. The rotary knife as claimed in claim 18, each of said faces presenting a mounting surface that contacts the frame, with each mounting surface defining the proximal-most end of the corresponding face,
said frame including clamping components that compressibly engage the mounting surfaces to releasably secure the housing to the frame.

27. The rotary knife as claimed in claim 26, said blade including a ring gear; and
a rotatable pinion connectable to a power source and drivingly intermeshed with the ring gear,
said clamping components including a pinion housing, in which the pinion is rotatably supported, and a pinion cover releasably interconnected with the housing.

28. The rotary knife as claimed in claim 18, said housing including a blade-supporting race defined along a circle centered on the central axis, said blade presenting a blade race in an opposed relationship with the blade-supporting race of the housing; and
a bushing operably positioned between the races.

29. The rotary knife as claimed in claim 28,
said housing being split to present spaced-apart circumferential housing ends,
said blade-supporting race extending continuously between the housing ends.

30. A blade housing for a rotary knife, wherein the housing is operable to support an annular blade on a frame for rotation about a central axis, said blade housing comprising:
opposite inner and outer annular faces,
at least one of said faces presenting a proximal-most end configured to contact the frame and a distal-most end configured to be spaced from the frame,
said proximal-most end being spaced from the central axis a first distance, and said distal-most end being spaced from the central axis a second distance, with the distances being different,
said housing including a blade-supporting race defined along a circle centered on the central axis,
said housing being split to present spaced-apart circumferential housing ends,
said blade-supporting race extending continuously between the housing ends.

31. The blade housing as claimed in claim 30,
said first distance being greater than the second distance.

32. The blade housing as claimed in claim 30,
said at least one of said faces having circumferentially extending portions, with a first one of the portions defining the proximal-most end and a second one of the portions defining the distal-most end,
each of said portions having a radius measured from a respective center point.

33. The blade housing as claimed in claim 32,
said center point associated with the second portion being the central axis.

34. The blade housing as claimed in claim 33,
said center point associated with the first portion being spaced from the central axis.

35. The blade housing as claimed in claim 30,
said at least one of said faces presenting a mounting surface that is configured to contact the frame and defines the proximal-most end,
said mounting surface extending along a circular arc having an angular measure of at least about 60°.

36. The blade housing as claimed in claim 35,
said angular measure being about 110°.

* * * * *